United States Patent
Vadapandeshwara et al.

(10) Patent No.: US 9,935,964 B2
(45) Date of Patent: Apr. 3, 2018

(54) ACCESS CONTROL FOR OBJECTS HAVING ATTRIBUTES DEFINED AGAINST HIERARCHICALLY ORGANIZED DOMAINS CONTAINING FIXED NUMBER OF VALUES

(71) Applicant: Oracle Financial Services Software Limited, Mumbai (IN)

(72) Inventors: Rajaram Narasimha Vadapandeshwara, Bangalore (IN); Bhargava Srinivasa, Bangalore (IN); Gangadhar Nagulakonda, Bangalore (IN)

(73) Assignee: ORACLE FINANCIAL SERVICES SOFTWARE LIMITED, Mumbai (IN)

( * ) Notice: Subject to any disclaimer, the term of this patent is extended or adjusted under 35 U.S.C. 154(b) by 10 days.

(21) Appl. No.: 14/628,308

(22) Filed: Feb. 23, 2015

(65) Prior Publication Data

US 2016/0104004 A1 Apr. 14, 2016

(30) Foreign Application Priority Data

Oct. 8, 2014 (IN) .......................... 5056/CHE/2014

(51) Int. Cl.
*G06F 21/60* (2013.01)
*G06F 21/62* (2013.01)
*H04L 29/06* (2006.01)

(52) U.S. Cl.
CPC .......... *H04L 63/104* (2013.01); *G06F 21/604* (2013.01); *G06F 21/62* (2013.01); *H04L 63/10* (2013.01); *H04L 63/20* (2013.01)

(58) Field of Classification Search
CPC ......... G06F 21/604; G06F 21/62; H04L 63/10
See application file for complete search history.

(56) References Cited

U.S. PATENT DOCUMENTS 5,978,796 A 11/1999 Malloy et al.
7,707,078 B2 4/2010 Bickel et al.
(Continued)

FOREIGN PATENT DOCUMENTS

EP 1195694 A2 4/2002
EP 1895446 A2 3/2008

OTHER PUBLICATIONS

ISR Search Report, Co-pending PCT International application No. PCT/IB2015/056172 (dated Aug. 13, 2015), dated Oct. 21, 2015, pp. 1-6.

(Continued)

*Primary Examiner* — Jason C Chiang
(74) *Attorney, Agent, or Firm* — IPHorizons PLLC; Narendra Reddy Thappeta

(57) ABSTRACT

An aspect of the present disclosure facilitates controlling access to objects having attributes defined against hierarchically organized domains, with each domain containing a corresponding fixed number of values. In one embodiment, in response to receiving data indicating specific hierarchies of the hierarchically organized domains, the corresponding fixed number of values of the corresponding domains in each hierarchy is displayed. Accordingly, a user is enabled to select a desired set of values from the corresponding fixed number of values of the corresponding domains, and to specify a security rule for a combination of the selected set of values and a user entity. The security rule is thereafter enforced when objects having attributes matching the selected set of values are accessed by the user entity.

20 Claims, 9 Drawing Sheets

(56) References Cited

U.S. PATENT DOCUMENTS

| | | |
|---|---|---|
| 7,716,233 B2 | 5/2010 | Xiong |
| 8,495,007 B2 | 7/2013 | Williamson |
| 2002/0095490 A1* | 7/2002 | Barker .................... H04L 29/06 709/224 |
| 2004/0122792 A1* | 6/2004 | Salazar ............... G06F 21/6218 |
| 2006/0059211 A1* | 3/2006 | Futatsugi .......... G06F 17/30607 |
| 2006/0143144 A1* | 6/2006 | Speeter ................. H04L 67/125 706/47 |
| 2008/0133530 A1* | 6/2008 | Wang ................. G06F 21/6218 |
| 2008/0134286 A1* | 6/2008 | Amdur .................. G06F 21/604 726/1 |
| 2008/0155652 A1* | 6/2008 | DeBie ................... G06F 21/604 726/2 |
| 2008/0209506 A1* | 8/2008 | Ghai ....................... G06F 21/55 726/1 |
| 2009/0018996 A1* | 1/2009 | Hunt ...................... G06Q 30/02 |
| 2011/0167372 A1 | 7/2011 | Iwai |
| 2012/0233689 A1* | 9/2012 | Korablev ............ G06F 21/6218 726/17 |
| 2013/0232539 A1* | 9/2013 | Polunin ................ G06Q 10/047 726/1 |
| 2014/0130180 A1* | 5/2014 | Balasubramanyan ............................. G06F 21/604 726/27 |
| 2014/0298481 A1* | 10/2014 | Gilroy .................. G06F 21/604 726/27 |

OTHER PUBLICATIONS

Written Opinion of the International Searching Authority, Co-pending PCT International application No. PCT/IB2015/056172 (dated Aug. 13, 2015), dated Oct. 21, 2015, pp. 1-6.

E. Weippl, O. Mangisengi, W. Essmayr, F. Lichtenberger, W. Winiwarter, An authorization model for data warehouses and OLAP, Workshop on Security in Distributed Data Warehousing, pp. 1-5, (New Orleans, Louisiana, USA), 2001.

How to implement row level security in framework manager, http://cognosknowhow.blogspot.in/2012/08/how-to-implement-row-level-security-in.html, date Aug. 24, 2012, pp. 1-4.

Mansmann F, Vinnik S, Abstract, Interactive Exploration of Data Traffic with Hierarchical Network Maps, Visualization and Computer Graphics, IEEE Transactions on, ISSN :1077-2626, Date of Publication :Nov.-Dec. 2006, pp. 1440-1449, vol. 12 , Issue: 6, Publisher:IEEE.

Hu Xiangdong, Tang Qiwei, Abstract, Research on secure MDS-MAP location algorithm, Information Science and Engineering (ICISE), 2010 2nd International Conference on, ISBN: 978-1-4244-7616-9, Date of Conference: Dec. 4-6, 2010, pp. 6835-6838, Publisher:IEEE.

* cited by examiner

340

| Region<br>Legal Entity | North America | | Others | | |
|---|---|---|---|---|---|
| | US | Canada | UK | Singapore | India |
| XYZ – Bank - Inc | ✓ | ✓ | | | |
| XYZ – Investments | | | ✓ | | |
| XYZ – Bank – Asia - Limited | XYZ – Bank – Singapore | | | ✓ | |
| | XYZ – Bank – India | | | | ✓ |

| Legal Entity | | Region | UG1 | UG2 | UG3 |
|---|---|---|---|---|---|
| XYZ – Bank - Inc | North America | US | ✓ | | |
| XYZ – Bank - Inc | North America | Canada | | | ✓ _365_ |
| XYZ – Investments | Others | UK | | | |
| XYZ – Bank – Singapore | Others | Singapore | ✓ | | |
| XYZ – Bank – Asia - Limited / XYZ – Bank – India | | India | | ✓ | |

FIG. 3C

ACCESS CONTROL FOR OBJECTS HAVING ATTRIBUTES DEFINED AGAINST HIERARCHICALLY ORGANIZED DOMAINS CONTAINING FIXED NUMBER OF VALUES

PRIORITY CLAIM

The instant patent application is related to and claims priority from the co-pending India provisional patent application entitled, "Access Control For Objects Having Attributes Defined Against Hierarchically Organized Domains Containing Fixed Number Of Values", Serial No.: 5056/CHE/2014, Filed: 8 Oct. 2014, which is incorporated in its entirety herewith to the extent not inconsistent with the disclosure herein.

BACKGROUND

Technical Field

The present disclosure relates to application servers, and more specifically to access control for objects (in such application servers) having attributes defined against hierarchically organized domains containing fixed number of values.

Related Art

Objects are used for digitally representing any entities of interest in applications. Each object typically has attributes, with the value of each attribute expressing a characteristic of the corresponding entity. The entities can be diverse things such as people, animals, organizations, systems, etc., as is well known in the relevant arts.

Attributes are defined in some environments, against domains containing fixed number of values, implying that an attribute can be assigned from only the values of the corresponding domain. The term 'fixed' implies that the number of values in the corresponding domain is finite. For example, a domain 'Country' contains a finite number of values, corresponding to the different countries in the world.

Domains are conveniently organized hierarchically (as a tree data structure) in several environments. For example, each value in the Country domain may be further qualified by a State domain, having again a fixed number of corresponding values (i.e., names of states). Each value in the State domain in turn may be further qualified by a City domain, thus forming hierarchically organized domains. As an additional illustration, applications in financial domain operate based on hierarchically organized domains such as Asset Classes, Product Types etc., specified by Basel Committee on Banking Supervision (BCBS).

There is a general need to provide access control for objects when corresponding attributes are defined against such hierarchically organized domains. Access control may specify aspects such as which users can access which objects, where and when such access is permitted or denied, the specific actions (add, modify, delete, etc.) permitted or denied for each user, etc., on the objects.

Aspects of the present disclosure facilitate access control in such environments, as described below with examples.

BRIEF DESCRIPTION OF THE DRAWINGS

Example embodiments of the present disclosure are described with reference to the accompanying drawings briefly described below.

FIG. 3B depicts the manner in which valid sets of values from multiple domains/hierarchies are indicated in one embodiment.

FIG. 3C depicts the manner in which an administrator is enabled to specify security rules against multiple domains/hierarchies in one embodiment.

Figure 4A:
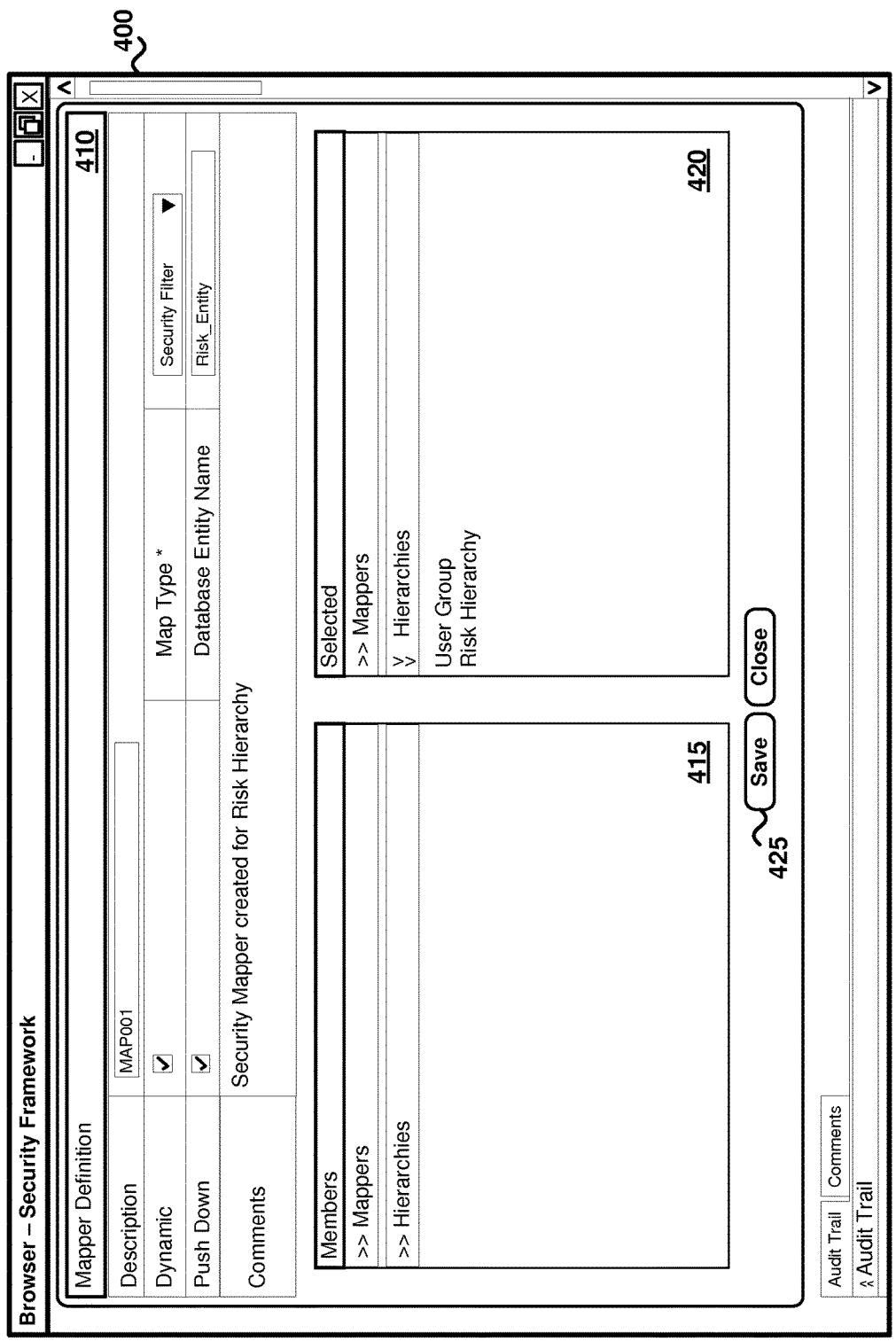
FIG. 4A illustrates a user interface that enables an administrator to select desired hierarchies of domains in one embodiment.
Figure 4B:
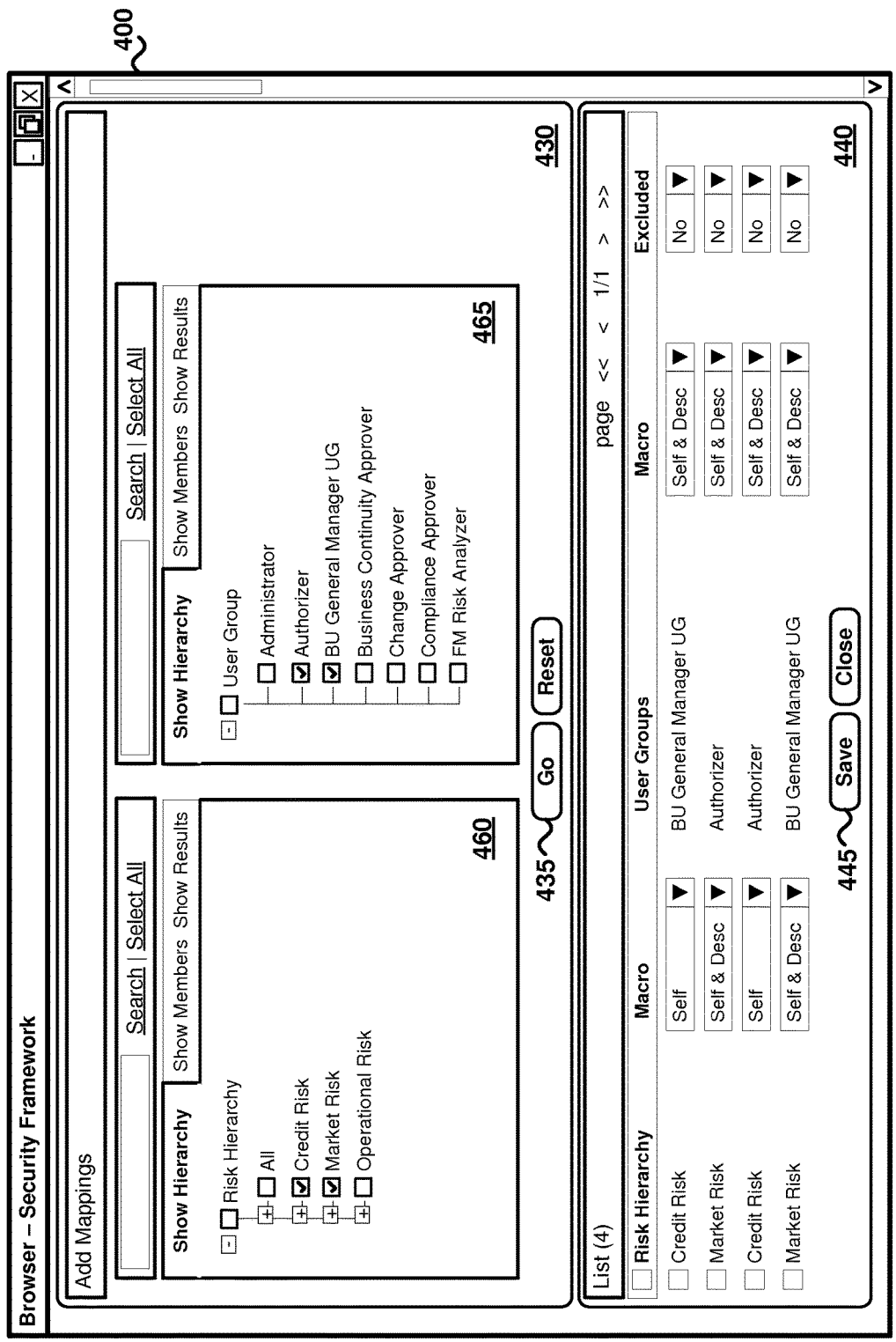
Figure 4C:
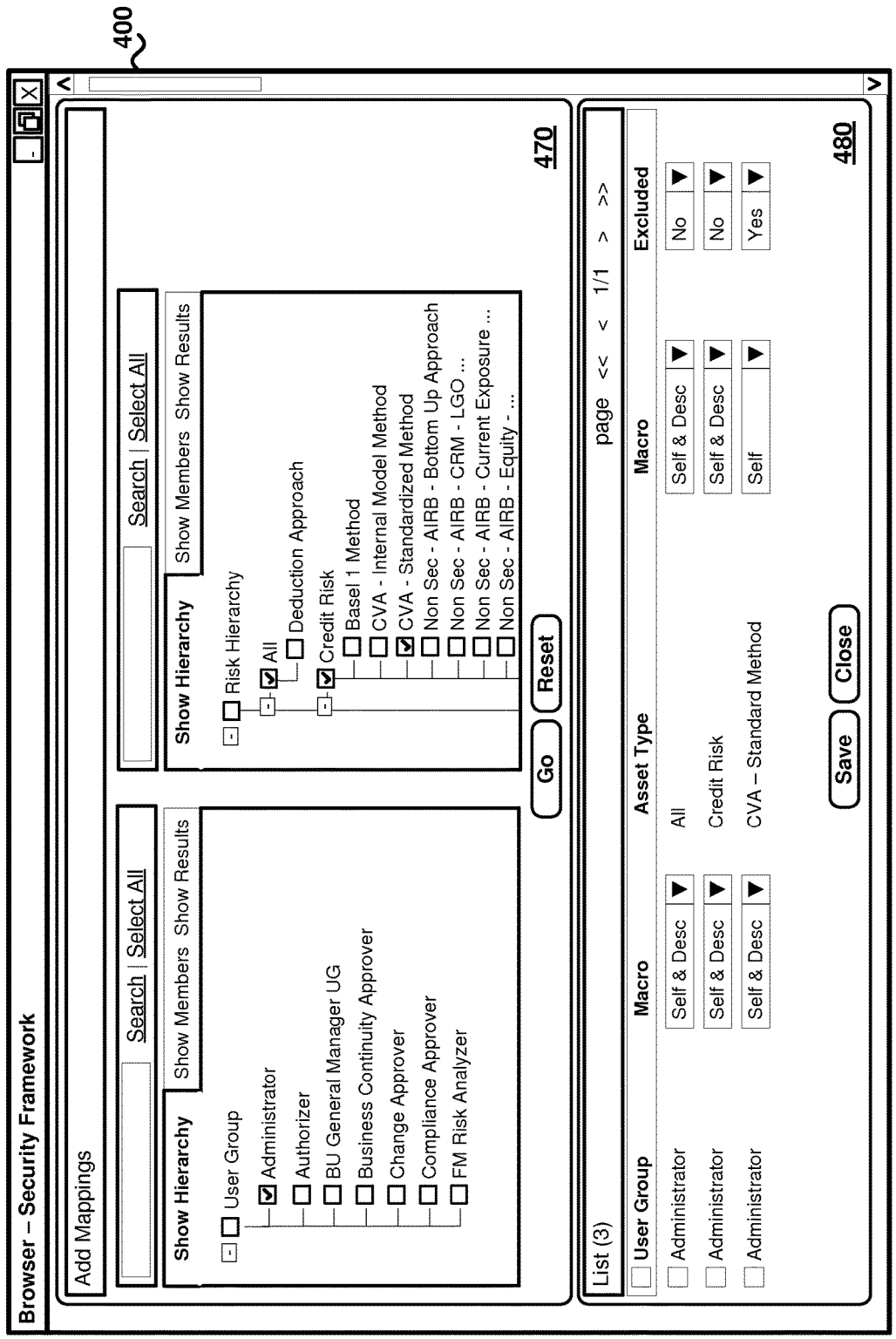

Each of FIGS. 4B and 4C illustrates a user interface that enables an administrator to specify a security rule based on selected hierarchies in one embodiment.

Figure 5:
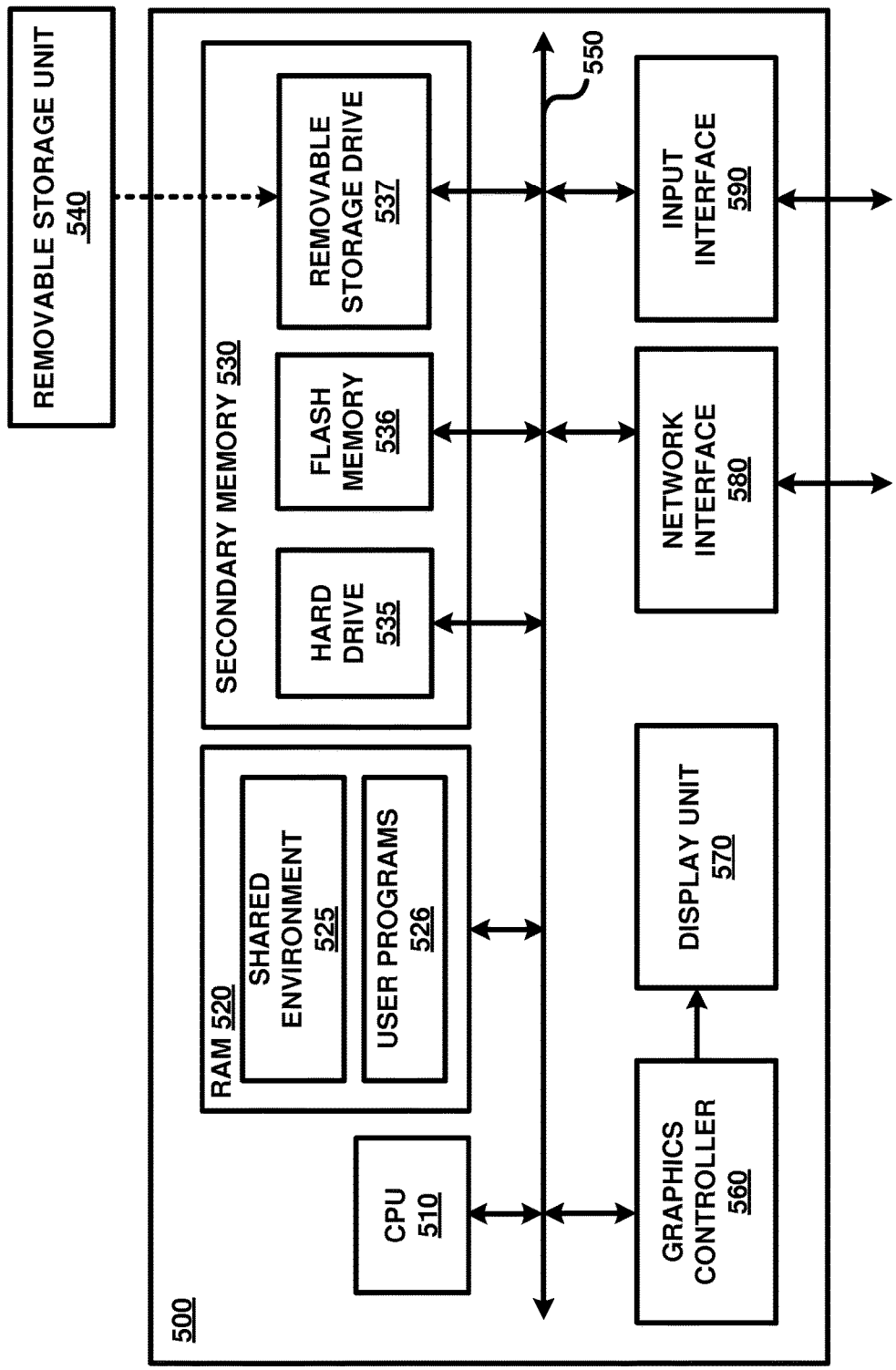

FIG. 5 is a block diagram illustrating the details of a digital processing system in which several aspects of the present disclosure are operative by execution of appropriate software instructions.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present disclosure facilitates controlling access to objects having attributes defined against hierarchically organized domains, with each domain containing a corresponding fixed number of values. In one embodiment, in response to receiving data indicating specific hierarchies of the hierarchically organized domains, the corresponding fixed number of values of the corresponding domains in each hierarchy is displayed. Accordingly, a user is enabled to select a desired set of values from the corresponding fixed number of values of the corresponding domains, and to specify a security rule for a combination of the selected set of values and a user entity.

The security rule is thereafter enforced when objects having attributes matching the selected set of values are accessed by the user entity. In one embodiment, the security rule permits access to the objects having attributes matching the selected set of values. As such, access is denied to objects if not permitted access by any corresponding security rule.

According to another aspect of the present disclosure, in response to receiving multiple hierarchies containing corresponding values (as nodes in the hierarchies), multiple tuples (of values) are displayed along respective lines. Each tuple contains an ordered sequence of elements, with each element set to one of the values of a corresponding hierarchy such that the tuples together represents a Cartesian product of values of all of the received hierarchies. The selection of the values for a user entity is performed by indicating lines corresponding to a set of tuples of interest. Accordingly, a security rule specified in combination with the selection is enforced when objects having attributes matching any of the selected tuples of interest are accessed by the user entity.

According to one more aspect of the present disclosure, the lines (corresponding to the tuples) are displayed along a first dimension, while a set of user entities including the above noted user entity are displayed along a second dimension. Accordingly, a user is enabled to select for each user entity, a corresponding set of lines/tuples of interest. A security rule specified in combination with the selection is enforced when objects having attributes matching any of the selected tuples/lines of interest are accessed by the corresponding user entity.

According to yet another aspect of the present disclosure, a data map representing the tuples in the Cartesian product (noted above) is displayed. The values of each of the (received) multiple hierarchies is displayed along a corresponding dimension of the data map. A user is accordingly enabled to indicate a set of valid tuples (from the displayed tuples), with each valid tuple representing a corresponding set of values that may be assigned to attributes of the objects. In response to the user indicating the valid tuples, only the indicated valid tuples are displayed as lines along the first dimension (noted above).

According to an aspect of the present disclosure, in response to a user selecting the first set of values (noted above) from a first hierarchy having values as nodes and then selecting a set of user entities from a second hierarchy having user entities as nodes, multiple tuples formed from the selected values and user entities are displayed along respective lines. Each tuple has elements at a first position and a second position that are respectively set of one of the selected set of user entities and the selected set of values such that the tuples together represents a Cartesian product of the selected set of values and the selected set of user entities. The user accordingly specifies the security rule (noted above) by selecting lines/tuples having the desired user entity in the first position and the desired values in the second position.

According to one more aspect of the present disclosure, the selection of values (from a hierarchy) includes a value of a domain (at a higher level in the hierarchy) and a descendant flag indicating whether or not include the sub-domains (at lower levels in the hierarchy relative to the higher level) under the value in the selection. If the descendant flag indicates that sub-domains are to be included, the selected set of values (which are used to determine the objects for which a security rule is to be enforced) includes the values of the first domain and also the sub-domains under the value in the hierarchy, but includes only the values of the domain otherwise.

According to another aspect of the present disclosure, the objects are stored in a relational database server and access to the objects is performed using SQL (structured query language) queries, wherein access to a first object by a user entity is performed using a first SQL query. The enforcing of a security rule is performed by appending a condition to a WHERE clause of the first SQL query, with the condition designed to check whether the attributes of the object matches a selected set of values (specified as part of the security rule).

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
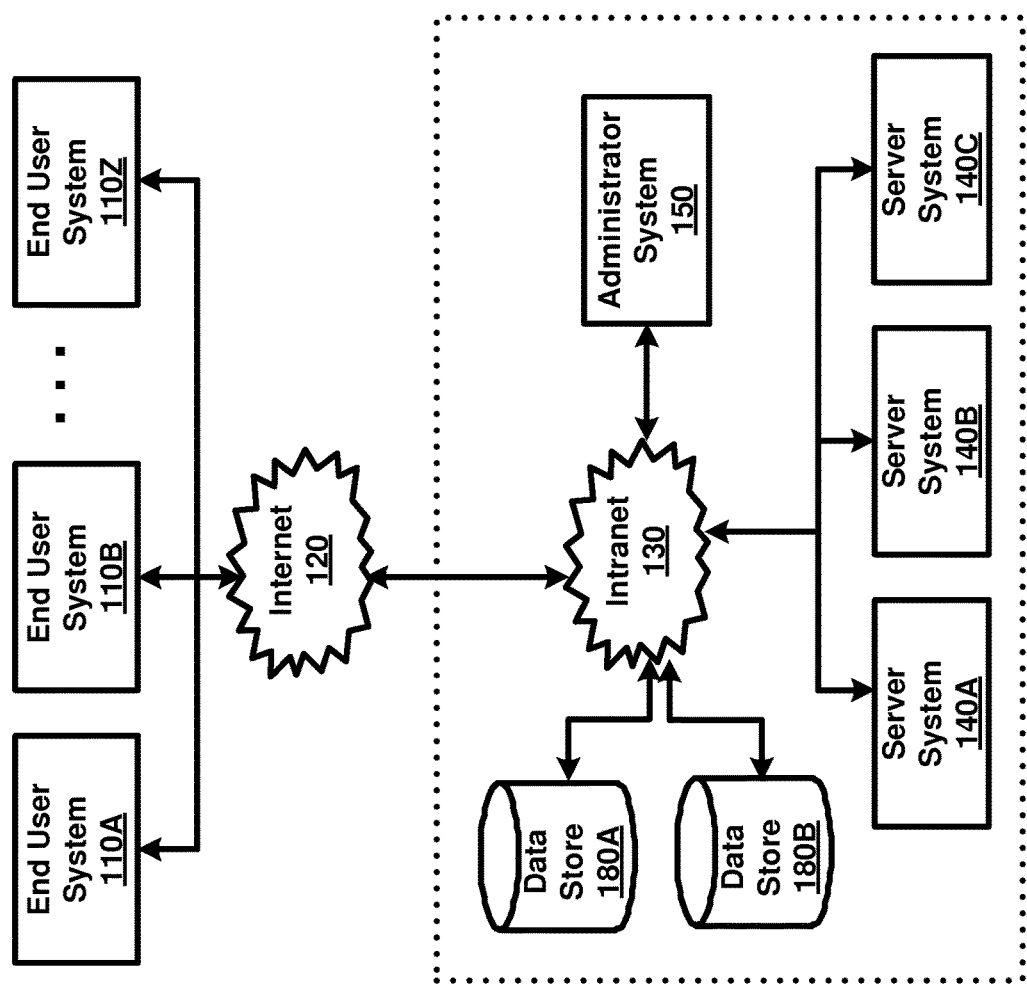
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing end user systems 110A-110Z, Internet 120, intranet 130, server systems 140A-140C, administrator system 150, and data stores 180A-180B.

Merely for illustration, only representative number/type of systems is shown in the Figure. Many environments often contain many more systems, both in number and type, depending on the purpose for which the environment is designed. Each system/device of FIG. 1 is described below in further detail.

Intranet 130 represents a network providing connectivity between server systems 140A-140C, administrator system 150 and data stores 180A-180B all provided within an enterprise (shown with dotted boundaries). Internet 120 extends the connectivity of these (and other systems of the enterprise) with external systems such as end user systems 110A-110Z. Each of intranet 140 and Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by networks 120 and 130. When the packet contains content such as port numbers, which specifies the destination application, the packet may be said to be directed to such application as well. The destination system may be required to keep the corresponding port numbers available/open, and process the packets with the corresponding destination ports. Each of Internet 120 and intranet 130 may be implemented using any combination of wire-based or wireless mediums.

Each of data stores 180A-180B represents a non-volatile (persistent) storage facilitating storage and retrieval of a collection of data by applications (such as financial applications, analytical frameworks, etc.) executing in other systems of the enterprise such as server systems 140A-140C and administrator system 150. Some of data stores 180A-180B may be implemented as a database server using relational database technologies and accordingly provide storage and retrieval of data using structured queries such as SQL (Structured Query Language). Other data stores may be implemented as a file server providing storage and retrieval of data in the form of files organized as one or more directories, as is well known in the relevant arts.

In one embodiment, the data maintained in data stores 180A-180B is modeled (and accordingly accessed by the applications) as objects. As is well known, an object contains various attributes, with an instance ("object instance") of the object having corresponding values for respective attributes. When stored in a relational database system, an object may correspond to one or more tables, with each attribute corresponding to a respective column of such table(s) and each object instance corresponding to a row in such table(s).

Each of end user systems 110A-110Z represents a system such as a personal computer, workstation, mobile station, mobile phones, computing tablets, etc., used by users to generate and send user requests directed to specific systems of the enterprise. The user requests may be generated using appropriate user interfaces (for example, web pages provided by applications executing in the enterprise). For example, the users may send user requests for performing various tasks to financial applications executing in server systems 140A-140C. In general, Each of server systems 140A-140C represents a server, such as a web/application server, executing financial applications capable of performing tasks requested by users using end user systems 110A-110Z. In response to receiving requests from end user systems, each server system performs the tasks specified in the requests and sends the result of performance of the tasks to the requesting end user system. Each server system may use data stored internally (for example, in a non-volatile storage/hard disk within the server), external data (e g, maintained in data stores 180A-180B) and/or data received from external sources (e.g., from the user) in performing such tasks.

It may be appreciated that each of server systems 140A-140C uses data modeled as objects having attributes. For the performance of a task, a server system may access one or more objects and perform various actions (such as add, edit, delete) on the objects as part of the task. For security reasons, it is generally desirable that the access to the objects be controlled during the performance of the user requested tasks. As such, in response to a user request (generated by a user using one of end user systems 110A-110Z), the tasks specified in the request are performed only if the user is permitted to access the objects required for the performance of the tasks.

There are several challenges to controlling access to objects. Financial applications typically operate with a large number/type (in the range of 1000+) of objects, and accordingly controlling access to such a large number of objects is difficult, both to specify and implement the access. Furthermore, the access to some of the objects may be required to be permitted/denied based on the values associated with the attributes of an object (e.g. ACCOUNT containing an attribute "Type" set to value "SAVINGS" and attribute "Country" as value "INDIA"), in contrast to being just based on a type of the object (e.g., ACCOUNT).

Administrator system 150, provided according to several aspects of the present disclosure, facilitates the access control for objects having attributes defined against hierarchically organized domains containing fixed number of values, as described below with examples.

3. Access Control for Objects

Figure 2:
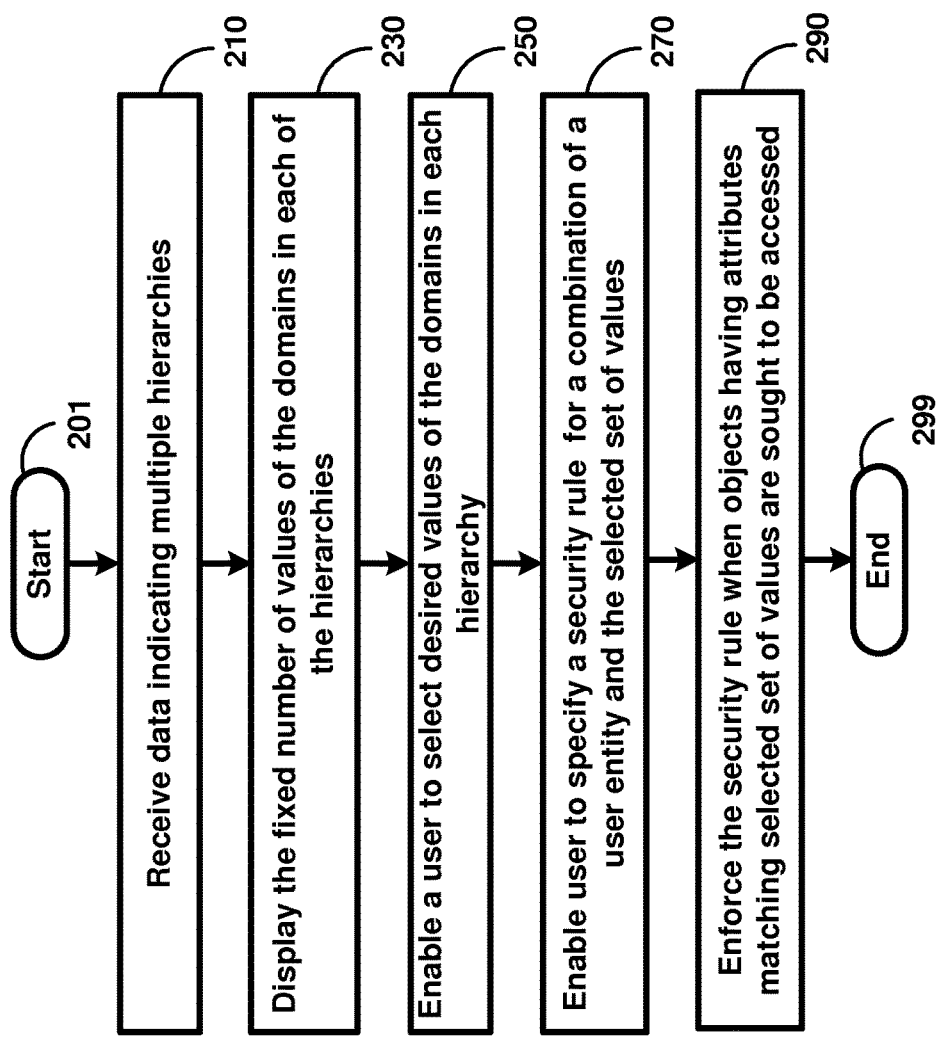
FIG. 2 is a flow chart illustrating the manner in which access is controlled to objects according to an aspect of the present disclosure.

FIG. 2 is a flow chart illustrating the manner in which access is controlled to objects according to an aspect of the present disclosure. The flowchart is described with respect to FIG. 1, in particular, administrator system 150 merely for illustration. However, many of the features can be implemented in other environments (and using potentially other types of systems/servers) also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, administrator system 150 receives data indicating multiple hierarchies of the hierarchically organized domains. An administrator may select those hierarchies, which are desired to be the basis for controlling access to various objects of interest. Alternatively, the data may be received (as a user request) from one of end user systems 110A-110Z.

In step 230, administrator system 150 displays the fixed number of values of the domains in each of the hierarchies. The values of the domains may be displayed in any convenient manner in a display unit associated with administrator system 150 or the requesting end user system (110A-110Z). Some sample user interfaces for displaying the values is described in below sections. As the number of values is fixed, the corresponding information can be determined using any of several known approaches. For example, the fixed number of values for each domain may be indicated in meta-data made available by an administrator.

In step 250, administrator system 150 enables a user (for example, the administrator) to select desired values of the domains in each hierarchy. The user may select one or more values at different levels within the corresponding hierarchy. Selection of a value at a higher level may imply inclusion of all the domains at the lower levels in the hierarchy. In one embodiment, the user is enabled to select a value at a higher level and indicate using a descendant flag whether the (values in the) sub-domains at lower levels under the selected value are to be included in the selection or not.

In step 270, administrator system 150 enables the user to specify a security rule for a combination of a user entity and the selected set of values. A user entity can be a single user or a group of users (defined based on roles, titles, etc.), as suited for the corresponding objective. The security rule may also be chosen consistent with the objective. Examples of security rules include permitting or denying access, authorization for various actions, etc., as will be apparent to one skilled in the relevant arts by reading the disclosure provided herein. Though the flowchart is shown as defining a single security rule, it should be appreciated that steps 210-270 may be performed iteratively to define a set of security rules implementing desired access controls.

In step 290, administrator system 150 enforces the security rule when objects having attributes matching selected set of values are sought to be accessed by the corresponding user entity. In other words, when a user entity attempts to access an object for performing an action, the security rules (defined in accordance with steps 210-270) that are applicable for the object are determined based on the attributes of the objects and the corresponding selected set of values specified in the security rules. The applicable security rules may then be applied to check whether or not the user entity should be permitted to complete the access/action on the specified object. In the following description, it is assumed that security rules permit access to the objects having attributes matching the selected set of values, such that access is denied to objects only if not permitted access by any corresponding security rule.

In an embodiment, enterprise applications in server system 140A may be designed to generate SQL queries directed to data stores 180A/180B, in response to various requests from end user systems 110A/110B. Server system 140A appends a condition to the WHERE clause of such SQL queries, with the condition being formed from the selected set of values specified in step 270. Accordingly, access control is implemented in server systems, without requiring changes to any database type technologies implemented in data stores 180A/180B. The flow chart ends in step 299.

Thus, by enabling a user/administrator to specify security rules for combinations of different sets of values (assigned to attributes of objects) and user entities, the controlling of access to a large number/type of objects is simplified. Furthermore, access based on values of the attributes is also facilitated. The manner in which administrator system 150 may perform the access control for objects according to FIG. 2 is illustrated below with examples.

4. Illustrative Example

FIGS. 3A-3C and 4A-4C together illustrate the manner in which access control for objects having attributed defined against hierarchically organized domains containing fixed number of values is provided in one embodiment. Each of the Figures is described in detail below.

Figure 3A:
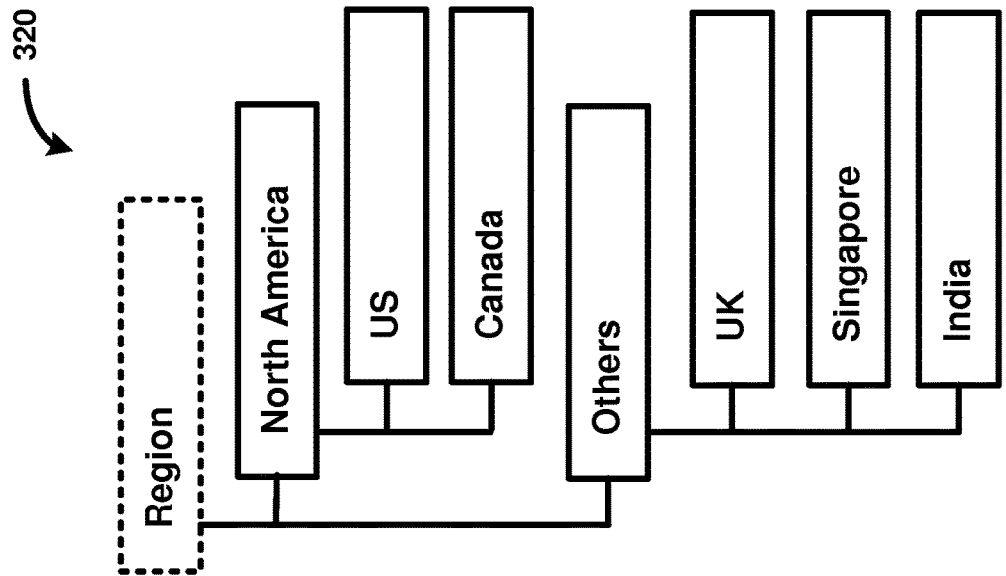
FIG. 3A depicts the manner in which domains containing fixed number of values are hierarchically organized in one embodiment.
Figure 3A:
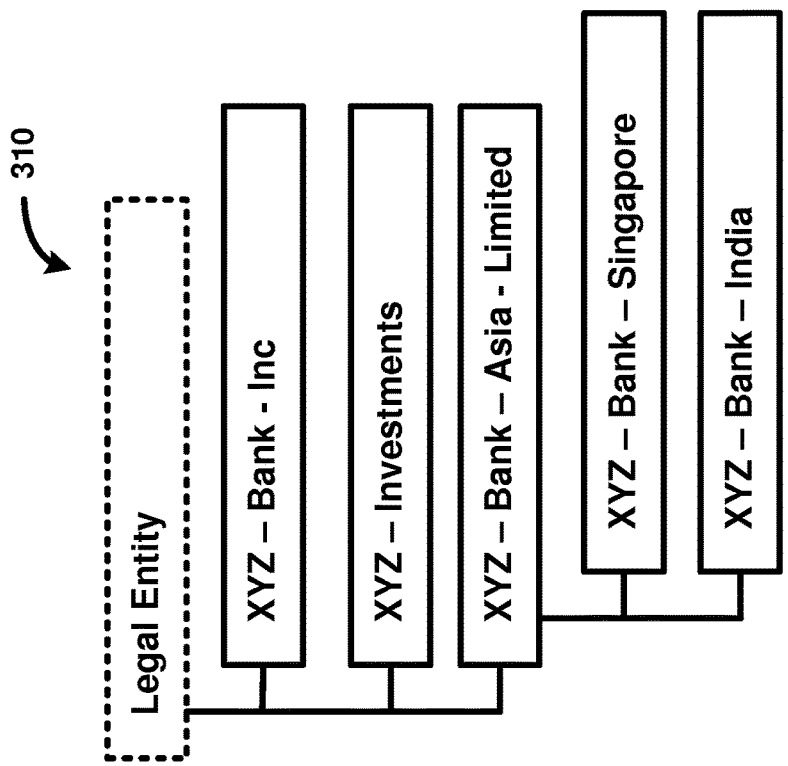

FIG. 3A depicts the manner in which domains containing fixed number of values are hierarchically organized in one embodiment. In particular, tree 310 depicts a hierarchy of domains with the root being the name of the hierarchy "Legal Entity". It should be noted that the name is shown symbolically (in dotted lines) as the root to indicate that all the domains (and corresponding values) belongs to the same hierarchy.

The "Legal Entity" hierarchy is shown as having a first domain (at level 1) containing the values "XYZ-Bank-Inc", "XYZ-Investments" and "XYZ-Bank-Asia-Limited". The value "XYZ-Bank-Asia-Limited" is shown as being further qualified by the sub-domain of values containing "XYZ-Bank-Singapore" and "XYZ-Bank-India" (which are at a lower level in comparison to the first domain) It may be appreciated that any of the values shown as the nodes of tree 310 (except the root) may be assigned to attributes of objects. In other words, an attribute of an object may be set to any one of the values, "XYZ-Bank-Inc", "XYZ-Investments", "XYZ-Bank-Asia-Limited", "XYZ-Bank-Singapore" and "XYZ-Bank-India".

Similarly, tree 320 depicts a hierarchy of domains with the symbolic root being the hierarchy name "Region". Tree 320 is shown having a first domain (at level 1) containing the values "North America" and "Others", and with each of the values being further qualified by respective sub-domains at the lower level. It may be appreciated that a financial application may have a large number of similar hierarchically organized domains (having more levels), each domain containing a fixed number of values.

Administrator system 150 may receive such hierarchies of domains (e.g., 310, 320, etc.) in response to a user selecting those hierarchies. Administrator system 150 then displays the values of the domains in a display unit associated with administrator system 150. Alternatively, the hierarchies may be received as a user request from one of end user systems 110A-110Z, with administrator system 150 then providing the display in a display unit associated with the requesting end user system.

According to aspects of the present disclosure, administrator system 150 facilitates a user/administrator to first indicate the valid sets of values that may be assigned to attributes of the objects stored in data stores 180A-180B, and then to specify a security rule for a combination of desired valid sets and user entities. The manner in which valid sets of values may be indicated is first described below, followed by the manner in which security rules may be specified based on such indicated sets of values.

5. Indicating Valid Sets of Values

FIG. 3B depicts the manner in which valid sets of values from multiple domains/hierarchies are indicated in one embodiment. In particular, in response to receiving multiple hierarchies containing corresponding values, administrator system 150 displays a data map with the values of each of the (received) hierarchies being displayed along a corresponding dimension of the data map. In other words, the data map represents the tuples (of values), each tuple containing an ordered sequence of elements, with each element set to one of the values of a corresponding hierarchy such that the tuples together represents a Cartesian product of values of all of the received hierarchies.

As is well known, a Cartesian product of domains/sets of values is defined as the set of n-tuples of the values from the domains, where each n-tuple contains one value from each domain/set. Thus, for two domains A and B, the Cartesian product is defined as the set of all 2-tuples, with each 2-tuple containing a value from domain A and also containing a value from domain B. The number of tuples is equal to the multiplication of the number of values in each domain (that is, m×n, if domain A contains m values and domain B contains n values).

In one embodiment, in response to receiving a first and a second hierarchy of values, administrator system 150 displays the values of the first hierarchy as rows (a first dimension) and the values of the second hierarchy as columns (a second dimension) of a two-dimensional matrix. The description is continued assuming that trees 310 and 320 shown in FIG. 3A are received as the hierarchies to be used for specifying security rules.

Table 340 depicts the two-dimensional matrix/data map that is displayed by administrator system 150 in response to receiving trees 310 and 320. It may be observed that the values of the domains in tree 310 are shown as rows of table 340 (the first dimension), while the values of the domains in tree 320 are shown as columns of table 340 (the second dimension). Each of the cells in table 340 represents a tuple of values, with the first value of the tuple being from tree 310 and the second value of the tuple being from tree 320.

A user/administrator performs the selection of valid tuples/sets of values that are to be basis for a security rule. For example, an administrator may select (as indicated by the tick in the corresponding cell) the cells shown in table 340, such as ("XYZ-Bank-Inc", "US"), ("XYZ-Bank-Inc", "Canada"), ("XYZ-Bank-Investments", "UK"), ("XYZ-Bank-Singapore", "Singapore"), and ("XYZ-Bank-India", "India"). The selected set of values represents the valid tuples that may be assigned to (corresponding) attributes of objects stored in data store 180A-180B.

Thus, a user/administrator indicates the specific valid tuples/sets of values. It may be appreciated that though only two hierarchies are shown above, the features of the present disclosure may be extended to multiple (more than two) hierarchies, with the data map being displayed as an n-dimensional matrix in an appropriate manner (e.g., multiple tables for three dimensions), as will be apparent to one skilled in the relevant arts by reading the disclosure herein. It should be noted that the valid tuples may be indicated in any other convenient manner as well. For example, the valid pairs may be pre-specified as part of a configuration data, with administrator system 150 then generating the interface of table 360 (described below) based on such configuration data, without providing the interface of table 340.

The user/administrator may thereafter specify a security rule (for example, allow access to objects having the selected values) for a desired/selected user entity. The manner in which administrator system 150 enables a user/administrator to specify security rules based on the values in the selected hierarchies is described below with examples.

6. Specifying Security Rules for User Entities

FIG. 3C depicts the manner in which an administrator is enabled to specify security rules against multiple domains/hierarchies in one embodiment. In particular, in response to receiving multiple hierarchies containing corresponding values, administrator system 150 displays multiple tuples (of values) as respective lines along a first dimension (for example, rows of a two-dimensional matrix), while multiple user entities are displayed along a second dimension (for example, columns of a two-dimensional matrix). The description is continued assuming that the user entities correspond to user groups defined in the financial application.

Table 360 depicts the two-dimensional matrix that is displayed by administrator system 150 in response to receiving the hierarchies of trees 310 and 320 shown in FIG. 3A and indicating various user groups of interest. It may be observed that only the valid tuples/sets of values indicated by the user in table 340 are shown as rows of table 360, while the user groups of interest (as indicated by the administrator) are shown as columns of table 360. However, in an alternative embodiment, all the tuples in the Cartesian product (i.e., including those that are not valid) may be displayed along the first dimension thereby enabling the user to specify any desired combination of tuple of values and user entity.

Thus, each of the cells in the table represents a combination of values, with the first value of the combination being from tree 310, the second value of the combination being from tree 320 and the third value of the combination being from the user groups (UG1, UG2, etc.). Each cell may also be viewed as a mapping from the 2-tuple of the Cartesian product corresponding to the row to the user group corresponding to the column.

A user/administrator may perform the selection of the values for a user entity (here, user group) by indicating the combination of values (that is the cells in table 360), and then specify a security rule for the combination of the selected values (in the row) and the user entity (along the column). For example, an administrator may select (as indicated by the tick in the corresponding cell) desired cells/triples as shown in table 360. It may be appreciate that the selection in cell 365 indicates that the objects having attributes matching the 2-tuple ("XYZ-Bank-Inc", "Canada") are allowed access to users belonging to the user group UG3.

The security rule specified by the administrator in table 360 may be stored in a non-volatile storage (such as data store 180A-180B), and thereafter retrieved and enforced when server system 140A-140C processes user requests received from end user systems 110A-110Z. For example, in response to a financial application (executing in a server system) receiving a user request from an end user system, the financial application may identify that the user request is received from a first user entity (for example, UG1) and that a first object is required to be accessed to process the user request.

The financial application (or a common application such as an authorization application) may then determine the set of security rules that are applicable for the first object (based on matching the hierarchies against which the attributes of the first object are defined with the hierarchies specified in the security rules). For example, a security rule specified for user entity UG1 in table 360 may be included in the set of applicable security rules, if the first object has two attributes that are respectively defined against (and according are assigned the values from) the hierarchies Legal Entity and Region.

The financial application may then be permitted to access the first object (and accordingly process the user request) if the two attributes (noted above) of the first object has (stored) values matching any of the indicated pairs of values (cells) in table 360 for the user entity UG1. In other words, the access is permitted if the two attributes has any of the pairs ("XYZ-Bank-Inc", "US"), and ("XYZ-Bank-Singapore", "Singapore"). It is assumed that security rules permit access to the objects having attributes matching the selected set of values, such that access is denied to objects only if not permitted access by any corresponding security rule.

Thus, an administrator is enabled to specify a security rule for multiple user entities. Some sample user interfaces that may be provided for facilitating the specification of the security rules is described below with examples.

7. Sample User Interfaces

FIGS. 4A-4C depicts sample user interfaces that may be provided for facilitating the specification of security rules in one embodiment. Display area 400 of each Figure depicts a portion of a user interface provided on a display unit (not shown in FIG. 1) associated with administrator system 150. In one embodiment, each display area corresponds to a browser displaying respective web pages provided by administrator system 150. The web pages are provided in response to an administrator of the enterprise sending appropriate requests using the browser in administrator system 150.

It may be appreciated that the matrices/tables of 340 and 360 of FIGS. 3B and 3C may be similarly provided as a part of a user interface. For example, table 340/360 may be provided along with other information shown in the user interfaces of FIGS. 4B-4C, as will be apparent to one skilled in the relevant arts by reading the disclosure herein. Each of FIGS. 4A-4C is described in detail below.

FIG. 4A illustrates a user interface that enables an administrator to select desired hierarchies of domains in one embodiment. Display area 410 enables the administrator to specify a name, description and other details of the security rule. It may be observed that the map type is shown selected as "Security Filter", indicating that the user/administrator is selecting hierarchies for specifying a security rule.

Accordingly, display area 415 displays the names of the hierarchies/domains defined (and available of selection) in a financial application, while display area 420 displays the names of the hierarchies/domains selected by the user/administrator (from the list shown in display area 415). It may be observed that display area 420 indicates that the administrator has selected the Risk Hierarchy and also the User Group hierarchy. In response, to the administrator clicking/selecting "Save" button 425, administrator system 150 identifies the hierarchies in display area 420 as those received from the user, and accordingly displays the values of the domains in the user selected hierarchies (of display area 420). The manner in which the values may be displayed is described below with examples.

Each of FIGS. 4B and 4C illustrates a user interface that enables an administrator to specify a security rule based on selected hierarchies in one embodiment. Referring to FIG. 4B, display area 430 is displayed in response to the user selecting the hierarchies in display area 420 of FIG. 4A. Each of display area 460 and 465 depicts a corresponding panel displaying the values of one of the selected hierarchies. While display area 460 is shown displaying the values from "Risk Hierarchy", display area 465 is shown displaying the values from "User Group". In general, display area 430 contains a number of panels equal to the number of hierarchies selected by the user (that is, the number of items in display area 420).

It may be observed that the values of the domains in the selected hierarchies are shown in display areas 460 and 465 in the form of corresponding tree structures. Each node in the tree structure is shown associated with a checkbox, which facilitates the user/administrator to select the desired values from the various domains of the displayed hierarchies. The administrator may select (by clicking/selecting the corresponding checkbox) the desired combination of values (from the hierarchies) and the user group in display area 430, and click/select "Go" button 435 to cause the combination to be added (and displayed) as a security rule in display area 440.

It should be noted that the administrator may perform the above actions of selecting the values and selecting button 435 repeatedly to add multiple security rules. In one embodiment, the administrator selects specific values from the hierarchies (such as 460 and 465) shown in display area 430, and in response to clicking the "Go" button, administrator system 150 generates the tuples from the selected values. It may be appreciated that since the user/administrator will generally select values (whose combinations) are possible to be assigned to the attributes of objects, only the valid tuples shown in display area 440.

Display area 440 facilitates a user to specify security rules based on the values in the selected hierarchies/domains. Display area 440 is shown displaying a Cartesian product of the values and user entities selected from hierarchies 460 and 465 respectively. It may be appreciated that each line in display area 440 represents a possible security rule that may be specified by the user.

Each line/security rule in display area 440 indicates the value (e.g., "Credit Risk") selected from the domain "Risk Hierarchy", a first macro indicating whether the security rule is applicable only to the domain value (option "Self") or to all the lower level domains under the value (option "Self & Desc"), a user group/entity (e.g. "Authorizer") for which the rule is applicable, and a second macro indicating whether the rule is applicable only to the group (option "Self") or to all the descendants of the group (option "Self & Desc"). Each line also indicates under the "Excluded" column whether the user group is to be permitted access (option "No") or is to be denied access (option "Yes").

It may be appreciated that the (first) macro associated with the domain value act as a descendant flag to indicate whether or not to include the sub-domains under the domain value in the selection of values. For example, the option "Self" specified for the value "Credit Risk" indicates that the security rule is applicable only for that value (that is, the selection includes only the value "Credit Risk"), while the option "Self & Desc" specified for the value "Market Risk" indicates that the security rule is applicable for that value and also all the values in the sub-domains under that value (that is, the selection includes the value "Market Risk" and all the values in the sub-domains under "Market Risk").

It may be further appreciated that most of the security rules indicate that access is to be permitted (option "No" under the "Excluded" column) upon attributes matching the selected set of values. Accordingly, administrator system 150 permits access to objects having attributes matching the selected set of values, and denies access to objects if not permitted access by any corresponding security rule. Alternatively, administrator system 150 denies access to objects if a security rule is specified with the corresponding values and the option "Yes" selected in the "Excluded" column.

The administrator then may select (by selecting the corresponding checkboxes) the desired security rules, and clicks/selects "Save" button 445 to cause the rules to be stored in a non-volatile storage (such as data stores 180A-180B). The security rules may thereafter be retrieved and enforced when server system 140A-140C processes user requests received from end user systems 110A-110Z, as noted above.

FIG. 4C illustrates a user interface similar to FIG. 4B, but with the administrator provided the ability to select the user group first and then the desired combination of values from the different domains Thus, display area 470 is similar to display area 430, but with the panel/hierarchy for user group shown first and the panel/hierarchy for the selected "Risk Hierarchy" shown second. Again, a user/administrator may select a combination of the desired user entities from the user group hierarchy and a corresponding selection of values from the other hierarchies and add the combinations (by clicking the "Go" button) as corresponding security rules. Display area 480 is similar to display area 440 and displays a possible list of security rules based on the values in the selected hierarchies/domains. However each line/security rule in display area 480 is shown with the user group specified first, followed by the "Asset Type" (the selected value).

It may be observed that the second and third lines/security rules in display area 480 indicates that the user entity "Administrator" is to be permitted access (option "No" under the "Excluded" column) to objects having an attribute matching the value "Credit Risk" or any of the values in the sub-domains (option "Self & Desc" under the second "Macro" column), but is to be denied access (option "Yes") to objects having an attribute matching the value "CVA—Standard Method" (in the sub-domain under the value "Credit Risk"). In other words, the second and third security rules operate to permit access to only those objects having an attribute matching either "Credit Risk" or any other value in the sub-domains under "Credit Risk" but excluding the value "CVA—Standard Method".

Thus, a user/administrator is facilitated to control access to objects having attributes defined against hierarchically organized domains containing fixed number of values. In particular, by specifying security rules for combinations of different sets of values (assigned to attributes of objects) and user entities, the task of controlling of access to a large number/type of objects is simplified.

It should be appreciated that the features described above can be implemented in various embodiments as a desired combination of one or more of hardware, executable modules, and firmware. The description is continued with respect to an embodiment in which various features are operative when the instructions in the executable modules are executed.

8. Digital Processing System

FIG. 5 is a block diagram illustrating the details of digital processing system 500 in which several aspects of the present disclosure are operative by execution of appropriate software instructions. Digital processing system 500 corresponds to administrator system 150 or other systems (e.g., end user systems 110A-110Z) from which various features described above can be provided.

Digital processing system 500 may contain one or more processors (such as a central processing unit (CPU) 510), random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present disclosure. CPU 510 may contain multiple processing units, with each processing unit potentially being designed for a specific task. Alternatively, CPU 510 may contain only a single general-purpose processing unit. RAM 520 may receive instructions from secondary memory 530 using communication path 550.

RAM 520 is shown currently containing software instructions constituting shared environment 525 and/or user programs 526 (such as financial applications, analytical framework, etc.). Shared environment 525 contains utilities shared by user programs, and such shared utilities include operating system, device drivers, virtual machines, flow engines, etc., which provide a (common) run time environment for execution of user programs.

Graphics controller 560 generates display signals (e.g., in RGB format) to display unit 570 based on data/instructions received from CPU 510. Display unit 570 contains a display screen to display the images defined by the display signals (such as the portions of the user interface of FIGS. 3B-3C and 4A-4C). Input interface 590 may correspond to a keyboard and a pointing device (e.g., touch-pad, mouse) that may be used to provide various inputs (such as to specify the desired inputs, etc. in the user interfaces of FIGS. 3B-3C and 4A-4C). Network interface 580 provides connectivity to a network (e.g., using Internet Protocol), and may be used to communicate with other connected systems (such as server systems 140A-140C, data stores 180A-180B).

Secondary memory 530 represents a non-transitory medium, which may store the data (for example, portions of data shown in FIG. 3A) and software instructions (for example, for performing the steps of FIG. 2), to enable digital processing system 500 to provide several features in accordance with the present disclosure. The code/instructions stored in secondary memory 530 may either be copied to RAM 520 prior to execution by CPU 510 for higher execution speeds, or may be directly executed by CPU 510.

Secondary memory 530 may contain hard drive 535, flash memory 536, and removable storage drive 537. Some or all of the data and instructions may be provided on removable storage unit 540, and the data and instructions may be read and provided by removable storage drive 537 to CPU 510. Removable storage unit 540 may be implemented using medium and storage format compatible with removable storage drive 537 such that removable storage drive 537 can read the data and instructions. Thus, removable storage unit 540 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 540 or hard disk installed in hard drive 535. These computer program products are means for providing software to digital processing system 500. CPU 510 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

9. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of controlling access to objects, said method comprising:

receiving data indicating a plurality of hierarchies of hierarchically organized domains, with each domain containing a corresponding fixed number of values, said plurality of hierarchies including a first hierarchy and a second hierarchy, said first hierarchy and said second hierarchy respectively specifying a first plurality of values and a second plurality of values which can be stored for attributes of said objects, wherein said objects are stored in a relational database server and access to said objects is performed using SQL (structured query language) queries;

displaying on a display unit at a first time instance, the values of the corresponding domains in each hierarchy of said plurality of hierarchies along with a plurality of user entities, wherein said first plurality of values and said second plurality of values are displayed on said display unit at said first time instance;

enabling a user to specify a first combination and a second combination, said first combination comprising a user entity from said plurality of user entities, and a first set of values from the displayed values of the corresponding domains, wherein said first set of values includes a first value from said first plurality of values of said first hierarchy and a second value from said second plurality of values of said second hierarchy, wherein said second combination comprises said user entity and a second set of values from the displayed values, said second set of values containing said first value and a third value from said second plurality of values of said second hierarchy, wherein said user selects a third set of values from said first hierarchy, said third set of values comprising a fifth value of a first domain in said first hierarchy and a descendant flag, wherein said first domain is at a higher level in said first hierarchy, wherein said fifth value is associated with sub-domains that are at lower levels relative to said higher level in said first hierarchy, wherein said descendant flag indicates whether or not to include the sub-domains under said fifth value in said selection, wherein said selection includes the values of said first domain and the sub-domains under said fifth value in said third set of values if said descendant flag indicates sub-domains are to be included in said selection, and only the values of said first domain otherwise;

enabling said user to specify a first security rule and a second security rule, said first security rule being for said first combination of said user entity and said first set of values including said first value and said second value, said second security rule being for said second combination of said user entity and said second set of values including said first value and said third value; and enforcing said first security rule and said second security rule, wherein said first security rule is enforced when an object having attributes matching said first set of values, including a first attribute of the object matching said first value and a second attribute of the object matching said second value, is accessed by said user entity, wherein said second security rule is enforced when another object having attributes matching said second set of values, including a third attribute of the another object matching said first value and a fourth attribute of the another object matching said third value, is accessed by said user entity, wherein said user specifies both of said first security rule and said second security based on the values of the corresponding domains displayed on said display unit at said first time instance, wherein access to a first object by said user entity is performed using a first SQL query, wherein said enforcing of said first security rule when said first object is accessed by said user entity comprises:

appending a condition to a WHERE clause of said first SQL query, said condition designed to check whether the attributes of said first object matches said first set of values.

2. The method of claim 1, wherein said displaying displays a plurality of tuples along respective lines with each tuple containing an ordered sequence of elements, wherein each element is set to one of the values of a corresponding hierarchy of said plurality of hierarchies such that said plurality of tuples together represents a Cartesian product of values of all of said plurality of hierarchies, wherein said selection comprises indicating a first line and a second line respectively corresponding to a first tuple of interest and a second tuple of interest, said first tuple of interest and said second tuple of interest being contained in said plurality of tuples, said first tuple of interest representing said first set of values including said first value and said second value, said second tuple of interest representing said second set of values including said first value and said third value, wherein said first security rule is specified for said first combination of said user entity and said first tuple of interest, wherein said second security rule is specified for said second combination of said user entity and said second tuple of interest, wherein said enforcing enforces said first security rule when objects having attributes matching said first tuple of interest are accessed by said user entity, wherein said enforcing enforces said second security rule when objects having attributes matching said second tuple of interest are accessed by said user entity.

3. The method of claim 2, wherein said lines are displayed along a first dimension and said plurality of user entities including said user entity are displayed along a second dimension, wherein said selection comprises indicating for each user entity of said plurality of user entities, a corresponding set of lines of interest, wherein said first line and second line is indicated for said user entity, wherein said enforcing enforces said first security rule and said second security rule when objects having attributes matching any of the tuples corresponding to said selected set of lines of interest are accessed by the corresponding user entity.

4. The method of claim 3, further comprising:

displaying a data map representing said plurality of tuples, wherein the values of each hierarchy of said plurality of hierarchies is displayed along a corresponding dimension of said data map; and receiving from said user, a set of valid tuples contained in said plurality of tuples, each valid tuple representing a corresponding set of values that may be assigned to attributes of the objects, wherein said displaying displays only said set of valid tuples as said lines along said first dimension.

5. The method of claim 1, wherein said plurality of hierarchies includes a third hierarchy having said plurality of user entities as nodes,
wherein said enabling enables said user to also select a set of user entities of said plurality of user entities, said set of user entities including said user entity,
wherein said method further comprises:
enabling said user to select a fourth set of values from said second hierarchy,
in response to said selection of said third set of values, said fourth set of values, and said set of user entities, displaying a plurality of tuples along respective lines with each tuple containing an ordered sequence of elements,
wherein elements at a first position, a second position and a third position in said ordered sequence, are respectively set to one of said set of user entities, one of said third set of values and one of said fourth set of values such that said plurality of tuples together represents a Cartesian product of said third set of values, said fourth set of values and said set of user entities,
wherein said user specifies said first security rule by selecting lines corresponding to a first set of tuples of said plurality of tuples, wherein a first tuple of said first set of tuples has said user entity in said first position, said first value in said second position and said second value in said third position,
wherein said user specifies said second security rule by selecting lines corresponding to a second set of tuples of said plurality of tuples, wherein a second tuple of said second set of tuples has said user entity in said first position, said first value in said second position and said third value in said third position.

6. The method of claim 5, wherein said first security rule permits access to corresponding objects having attributes matching said first set of values, wherein access is denied to objects if not permitted access by any corresponding security rule.

7. The method of claim 1, wherein said method is implemented in a financial application server, wherein said objects are application objects defined in a financial application executing in said financial application server.

8. A non-transitory machine readable medium storing one or more sequences of instructions for enabling a system to control access to objects, wherein execution of said one or more instructions by one or more processors contained in said system enables said system to perform the actions of:
receiving data indicating a plurality of hierarchies of hierarchically organized domains, with each domain containing a corresponding fixed number of values,
said plurality of hierarchies including a first hierarchy and a second hierarchy,
said first hierarchy and said second hierarchy respectively specifying a first plurality of values and a second plurality of values which can be stored for attributes of said objects, wherein said objects are stored in a relational database server and access to said objects is performed using SQL (structured query language) queries;
displaying on a display unit at a first time instance, the values of the corresponding domains in each hierarchy of said plurality of hierarchies along with a plurality of user entities, wherein said first plurality of values and said second plurality of values are displayed on said display unit at said first time instance;
enabling a user to specify a first combination and a second combination, said first combination comprising a user entity from said plurality of user entities, and a first set of values from the displayed values of the corresponding domains, wherein said first set of values includes a first value from said first plurality of values of said first hierarchy and a second value from said second plurality of values of said second hierarchy,
wherein said second combination comprises said user entity and a second set of values from the displayed values, said second set of values containing said first value and a third value from said second plurality of values of said second hierarchy,
wherein said user selects a third set of values from said first hierarchy, said third set of values comprising a fifth value of a first domain in said first hierarchy and a descendant flag, wherein said first domain is at a higher level in said first hierarchy, wherein said fifth value is associated with sub-domains that are at lower levels relative to said higher level in said first hierarchy,
wherein said descendant flag indicates whether or not to include the sub-domains under said fifth value in said selection,
wherein said selection includes the values of said first domain and the sub-domains under said fifth value in said third set of values if said descendant flag indicates sub-domains are to be included in said selection, and only the values of said first domain otherwise;
enabling said user to specify a first security rule and a second security rule, said first security rule being for said first combination of said user entity and said first set of values including said first value and said second value,
said second security rule being for said second combination of said user entity and said second set of values including said first value and said third value; and
enforcing said first security rule and said second security rule, wherein said first security rule is enforced when an object having attributes matching said first set of values, including a first attribute of the object matching said first value and a second attribute of the object matching said second value, is accessed by said user entity,
wherein said second security rule is enforced when another object having attributes matching said second set of values, including a third attribute of the another object matching said first value and a fourth attribute of the another object matching said third value, is accessed by said user entity,
wherein said user specifies both of said first security rule and said second security based on the values of the corresponding domains displayed on said display unit at said first time instance,
wherein access to a first object by said user entity is performed using a first SQL query, wherein said enforcing of said first security rule when said first object is accessed by said user entity comprises:
appending a condition to a WHERE clause of said first SQL query, said condition designed to check whether the attributes of said first object matches said first set of values.

9. The non-transitory machine readable medium of claim 8, wherein said displaying displays a plurality of tuples along respective lines with each tuple containing an ordered sequence of elements,
wherein each element is set to one of the values of a corresponding hierarchy of said plurality of hierarchies such that said plurality of tuples together represents a Cartesian product of values of all of said plurality of hierarchies, wherein said selection comprises indicating a first line and a second line respectively corresponding to a first tuple of interest and a second tuple of interest, said first tuple of interest and said second tuple of interest being contained in said plurality of tuples, said first tuple of interest representing said first set of values including said first value and said second value, said second tuple of interest representing said second set of values including said first value and said third value, wherein said first security rule is specified for said first combination of said user entity and said first tuple of interest, wherein said second security rule is specified for said second combination of said user entity and said second tuple of interest, wherein said enforcing enforces said first security rule when objects having attributes matching said first tuple of interest are accessed by said user entity, wherein said enforcing enforces said second security rule when objects having attributes matching said second tuple of interest are accessed by said user entity.

10. The non-transitory machine readable medium of claim 9, wherein said lines are displayed along a first dimension and said plurality of user entities including said user entity are displayed along a second dimension, wherein said selection comprises indicating for each user entity of said plurality of user entities, a corresponding set of lines of interest, wherein said first line and second line is indicated for said user entity, wherein said enforcing enforces said first security rule and said second security rule when objects having attributes matching any of the tuples corresponding to said selected set of lines of interest are accessed by the corresponding user entity.

11. The non-transitory machine readable medium of claim 10, further comprising one or more instructions for:

displaying a data map representing said plurality of tuples, wherein the values of each hierarchy of said plurality of hierarchies is displayed along a corresponding dimension of said data map; and receiving from said user, a set of valid tuples contained in said plurality of tuples, each valid tuple representing a corresponding set of values that may be assigned to attributes of the objects, wherein said displaying displays only said set of valid tuples as said lines along said first dimension.

12. The non-transitory machine readable medium of claim 8, wherein said plurality of hierarchies includes a third hierarchy and having said plurality of user entities as nodes, wherein said enabling enables said user to also select a set of user entities of said plurality of user entities, said set of user entities including said user entity, further comprising one or more instructions for:

enabling said user to select a fourth set of values from said second hierarchy, in response to said selection of said third set of values, said fourth set of values, and said set of user entities, displaying a plurality of tuples along respective lines with each tuple containing an ordered sequence of elements, wherein elements at a first position, a second position and a third position in said ordered sequence, are respectively set to one of said set of user entities, one of said third set of values and one of said fourth set of values such that said plurality of tuples together represents a Cartesian product of said third set of values, said fourth set of values and said set of user entities, wherein said user specifies said first security rule by selecting lines corresponding to a first set of tuples of said plurality of tuples, wherein a first tuple of said first set of tuples has said user entity in said first position, said first value in said second position and said second value in said third position, wherein said user specifies said second security rule by selecting lines corresponding to a second set of tuples of said plurality of tuples, wherein a second tuple of said second set of tuples has said user entity in said first position, said first value in said second position and said third value in said third position.

13. The non-transitory machine readable medium of claim 8, wherein said first security rule permits access to corresponding objects having attributes matching said first set of values, wherein access is denied to objects if not permitted access by any corresponding security rule.

14. A computing system comprising:

a relational database server to store a plurality of objects;

an administrator system operable to:

receive data indicating a plurality of hierarchies of hierarchically organized domains, with each domain containing a corresponding fixed number of values, said plurality of hierarchies including a first hierarchy and a second hierarchy, said first hierarchy and said second hierarchy respectively specifying a first plurality of values and a second plurality of values which can be stored for attributes of said plurality of objects, wherein said objects are stored in a relational database server and access to said objects is performed using SQL (structured query language) queries;

display on a display unit at a first time instance, the values of the corresponding domains in each hierarchy of said plurality of hierarchies along with a plurality of user entities, wherein said first plurality of values and said second plurality of values are displayed on said display unit at said first time instance;

enable a user to specify a first combination and a second combination, said first combination comprising a user entity from said plurality of user entities, and a first set of values from the displayed values of the corresponding domains, wherein said first set of values includes a first value from said first plurality of values of said first hierarchy and a second value from said second plurality of values of said second hierarchy, wherein said second combination comprises said user entity and a second set of values from the displayed values, said second set of values containing said first value and a third value from said second plurality of values of said second hierarchy, wherein said user selects a third set of values from said first hierarchy, said third set of values comprising a fifth value of a first domain in said first hierarchy and a descendant flag, wherein said first domain is at a higher level in said first hierarchy, wherein said fifth value is associated with sub-domains that are at lower levels relative to said higher level in said first hierarchy, wherein said descendant flag indicates whether or not to include the sub-domains under said fifth value in said selection, wherein said selection includes the values of said first domain and the sub-domains under said fifth value in said third set of values if said descendant flag indicates sub-domains are to be included in said selection, and only the values of said first domain otherwise; and enable said user to specify a first security rule and a second security rule, said first security rule being for said first combination of said user entity and said first set of values including said first value and said second value, said second security rule being for said second combination of said user entity and said second set of values including said first value and said third value, wherein said user specifies both of said first security rule and said second security based on the values of the corresponding domains displayed on said display unit at said first time instance; and a server system operable to:
receive a user request from said user entity;
determine that a first object having attributes matching said first set of values, including a first attribute of said first object matching said first value and a second attribute of said first object matching said second value, is to be accessed for processing said user request; and
enforce said first security rule as against said first object in processing said user request, as a response to said user having specified said first security rule for said combination of said first set of values and said user entity,
wherein access to a first object by said user entity is performed using a first SQL query, wherein to enforce said first security rule when said first object is accessed by said user entity a condition is appended to a WHERE clause of said first SQL query, said condition designed to check whether the attributes of said first object matches said first set of values.

15. The computing system of claim 14, wherein said server system is a financial application server, wherein said plurality of objects are application objects defined in a financial application executing in said financial application server.

16. The computing system of claim 14, wherein said administrative system displays a plurality of tuples along respective lines with each tuple containing an ordered sequence of elements,
wherein each element is set to one of the values of a corresponding hierarchy of said plurality of hierarchies such that said plurality of tuples together represents a Cartesian product of values of all of said plurality of hierarchies,
wherein said selection comprises indicating a first line and a second line respectively corresponding to a first tuple of interest and a second tuple of interest, said first tuple of interest and said second tuple of interest being contained in said plurality of tuples, said first tuple of interest representing said first set of values including said first value and said second value, said second tuple of interest representing said second set of values including said first value and said third value,
wherein said first security rule is specified for said first combination of said user entity and said first tuple of interest, wherein said second security rule is specified for said second combination of said user entity and said second tuple of interest,
wherein said enforcing enforces said first security rule when objects having attributes matching said first tuple of interest are accessed by said user entity,
wherein said enforcing enforces said second security rule when objects having attributes matching said second tuple of interest are accessed by said user entity.

17. The computing system of claim 16, wherein said lines are displayed along a first dimension and said plurality of user entities including said user entity are displayed along a second dimension,
wherein said selection comprises indicating for each user entity of said plurality of user entities, a corresponding set of lines of interest, wherein said first line and second line is indicated for said user entity,
wherein said enforcing enforces said first security rule and said second security rule when objects having attributes matching any of the tuples corresponding to said selected set of lines of interest are accessed by the corresponding user entity.

18. The computing system of claim 17, wherein said administrative system is further operable to:
display a data map representing said plurality of tuples, wherein the values of each hierarchy of said plurality of hierarchies is displayed along a corresponding dimension of said data map; and
receive from said user, a set of valid tuples contained in said plurality of tuples, each valid tuple representing a corresponding set of values that may be assigned to attributes of the objects,
wherein said administrative system displays only said set of valid tuples as said lines along said first dimension.

19. The computing system of claim 14, wherein said plurality of hierarchies includes a third hierarchy having said plurality of user entities as nodes,
wherein said enabling enables said user to also select a set of user entities of said plurality of user entities, said set of user entities including said user entity,
wherein said administrative system is further operable to:
enabling said user to select a fourth set of values from said second hierarchy,
in response to said selection of said third set of values, said fourth set of values, and said set of user entities, displaying a plurality of tuples along respective lines with each tuple containing an ordered sequence of elements,
wherein elements at a first position, a second position and a third position in said ordered sequence, are respectively set to one of said set of user entities, one of said third set of values and one of said fourth set of values such that said plurality of tuples together represents a Cartesian product of said third set of values, said fourth set of values and said set of user entities,
wherein said user specifies said first security rule by selecting lines corresponding to a first set of tuples of said plurality of tuples, wherein a first tuple of said first set of tuples has said user entity in said first position, said first value in said second position and said second value in said third position,
wherein said user specifies said second security rule by selecting lines corresponding to a second set of tuples of said plurality of tuples, wherein a second tuple of said second set of tuples has said user entity in said first position, said first value in said second position and said third value in said third position.

20. The computing system of claim 19, wherein said first security rule permits access to corresponding objects having attributes matching said first set of values, wherein access is denied to objects if not permitted access by any corresponding security rule.

\* \* \* \* \*